United States Patent [19]
Woelffer et al.

[11] 3,805,499
[45] Apr. 23, 1974

[54] LAWN MOWER AND BAG CATCHER ASSEMBLY

[75] Inventors: Neill C. Woelffer; Charles A. Wuerker, Jr., both of Racine; Donald G. Haffner, Greendale, all of Wis.

[73] Assignee: Jacobsen Manufacturing Company, Racine, Wis.

[22] Filed: June 19, 1972

[21] Appl. No.: 264,396

[52] U.S. Cl. .................................. 56/202, 56/320.2
[51] Int. Cl. .................................. A01d 35/22
[58] Field of Search ............................ 56/202, 320.2

[56] References Cited

UNITED STATES PATENTS

| | | | |
|---|---|---|---|
| 2,973,614 | 3/1961 | Horner et al. | 56/320.2 |
| 3,220,170 | 11/1965 | Smith et al. | 56/255 |
| 3,726,069 | 4/1973 | Cope | 56/202 |

*Primary Examiner*—Russell R. Kinsey
*Attorney, Agent, or Firm*—Arthur J. Hansmann

[57] ABSTRACT

A lawn mower and bag catcher assembly wherein the lawn mower housing outlet has a grass chute hingedly mounted thereabove, and a grass catcher bag is mountable on the housing to catch the clippings exhausted through the mower outlet. The chute is movable between a lowered position which deflects the grass in the outlet flow thereof and a raised position where the chute is out of the way of the grass catcher bag mounted on the mower. A probe member is on the grass catcher and engages the chute for raising the chute out of the way when the bag is being mounted onto the mower. The bag is pivotally mounted on the mower, and the probe is flexible to permit the bag to pivot when it is on the mower for moving the bag out of the way of obstacles, such as trees and bushes, laterally of the mower.

8 Claims, 4 Drawing Figures

LAWN MOWER AND BAG CATCHER ASSEMBLY

This invention relates to a lawn mower and bag catcher assembly wherein a rotary lawn mower has a laterally disposed discharge chute and a grass catcher bag is removably mounted on the mower.

BACKGROUND OF THE INVENTION

Grass catchers of the bag type are commonly known in the art, and they are applied to rotary mowers such that the bag can be hooked on to the mower for catching the grass, and the bag can be removed from the mower for emptying the grass or for operating the mower without the bag. Examples of such mowers and catchers are found in U.S. Pat. No. 3,112,597. The prior art mowers also are arranged with hinged covers over the mower outlet openings, and these covers can be moved upwardly when the bag is mounted on the mower, such as shown in U.S. Pat. No. 3,132,457.

In the present invention, the rotary mower is provided with a chute which extends outwardly from the mower housing and which deflects and guides the grass clippings being blown from the housing and which protects against the operator putting his foot under the housing and into the path of the rotating cutter. That is, the chute serves the dual purpose of guiding the discharge of grass and preventing moving the operator's foot close enough to the mower to have it in the path of the rotating cutter. However, when such chute is provided on the mower, then there is a problem with respect to mounting and removing the grass catcher bag at the very point on the mower where the chute is located. In the present invention, the chute and bag are arranged so that the mounting and removal of the bag can be safely and easily accomplished, and this is a primary object of the present invention.

In accomplishing the aforementioned object, the operator can stand completely clear of the mower, both with respect to his hands and feet, and he can manipulate the bag and negotiate the chute in the mounting and removal of the bag.

Expressing the aforementioned objective in somewhat different terms, it is an object of this invention to provide a mower and grass catcher assembly which is completely safe relative to the mounting and removal of the catcher while the mower is operating.

Another object of this invention is to provide a lawn mower and grass catcher assembly which accomplishes the aforementioned objectives and which permits the bag to be pivotally mounted on the mower so that the bag can be moved out of the way of trees and bushes as the mower is moving past the trees and bushes, but to do so without requiring removal of the catcher or elaborate manipulation of the catcher to clear the obstacles mentioned.

Other objects and advantages include the provision of a lawn mower and grass catcher assembly wherein the mower is a rotary type with a laterally disposed chute and the grass catcher is a bag type which is used alternatively with the function of the chute, and the chute and catcher are compatibly related on the mower and are readily and easily disposed in their operating positions. Additionally, the aforementioned objectives are accomplished with an inexpensive structure which is readily and easily manipulated and positioned for operation and which provides for efficient use and complete safety of the operator.

Other objects and advantages will become apparent upon reading the following description.

DETAILED DESCRIPTION OF THE PREFERRED EMBODIMENT

The drawings show a rotary mower having a conventional housing 10 wherein the usual rotating blade is disposed, and an engine 11 powers the rotation of the blade. The mower is mobily supported on the ground by conventional wheels 12, and the usual handle would be attached and included in the mower for guiding the mower over the ground. The entire arrangement could be similar to that shown in U.S. Pat. No. 3,112,597 which is also common to conventional rotary mowers and which structure is readily understood by one skilled in the art.

Figures 2, 3, 4:
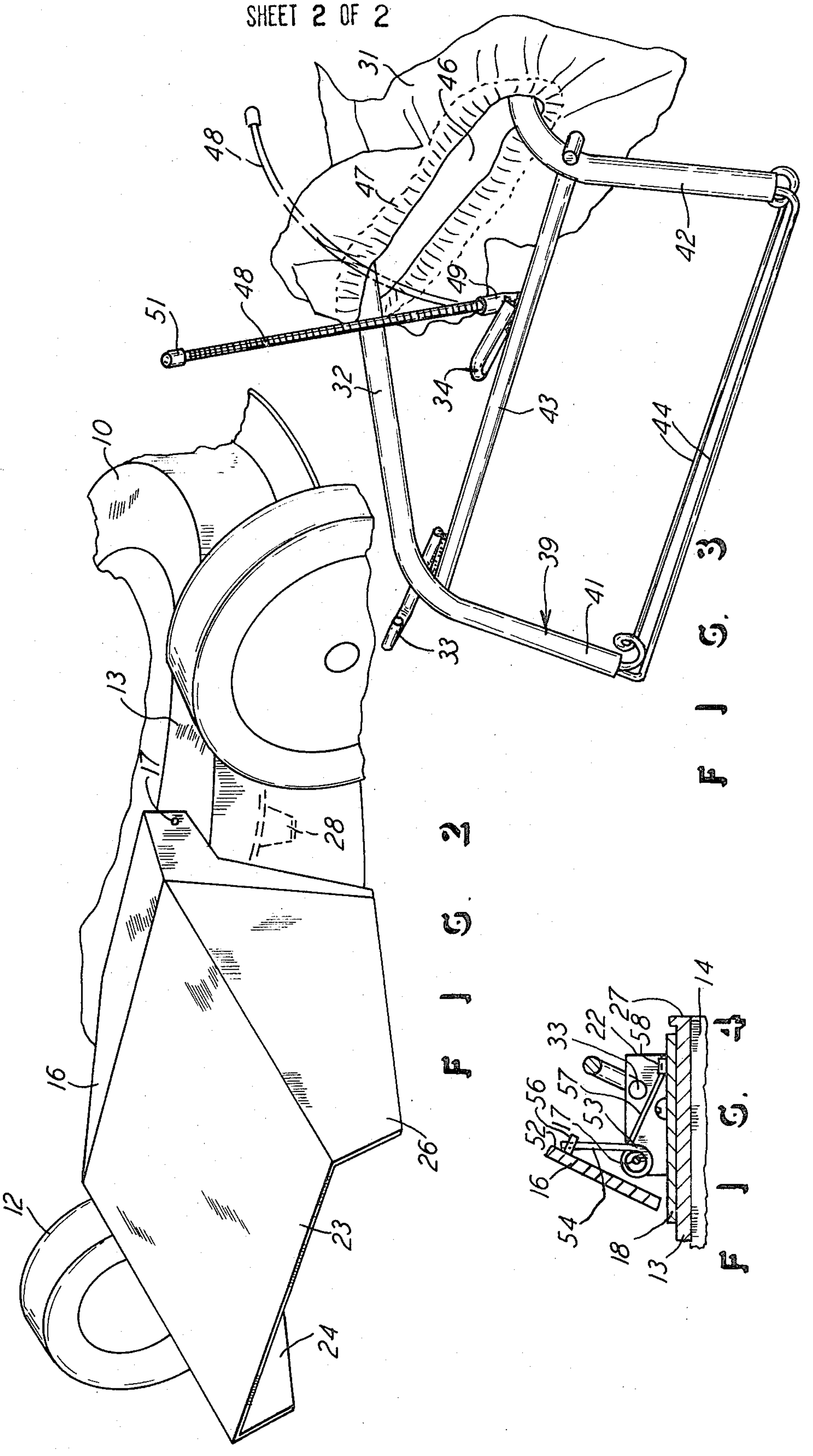
FIG. 2 is a side perspective view similar to FIG. 1 but showing the chute in its operating or lowered position.
FIG. 3 is an enlarged perspective view of the mower end of the grass catcher, fragmentarily shown, and showing one part thereof in a flexed position, as seen in dot dash lines.
FIG. 4 is an enlarged sectional view taken on the line 4—4 of FIG. 1.

The mower 10 has a spiral-shaped portion 13 which extends across the front of the mower and terminates on the right side of the mower, from the operator's facing position, and the portion 13 serves as a conduit for guiding the grass clipping through and away from the mower. Thus the clippings are directed to the right side rearwardly of the mower, in the conventional or common manner of directing the debris and clippings, and FIG. 4 shows the mower clipping outlet 14 which extends laterally of the mower.

A grass chute 16 is hingedly supported on the mower by means of a hinge pin or rod 17 mounted on the mower by means of a mounting bracket 18. Screws 19 are shown holding the bracket 18 to the mower housing, and upstanding arms 21 and 22 of the bracket 18 receive the hinge pin 17 for supporting the hinge pin and in turn hingedly supporting the deflector 16. The chute 16 has a top wall 23 and two depending side walls 24 and 26, and these three walls form an extension to the mower spiraled portion 13, and thus an extended chute is provided 16 to direct and guide the grass clippings from the mower. That is, the chute 16 conforms to the shape of the mower outlet 14 and is in flow communication therewith relative to the blowing and throwing of the clippings from the mower. FIG. 4 shows that the mower housing presents its terminal edge 27 to define the mower outlet 14, and the chute 16 extends above the edge 27 and laterally therebeyond to guide the clippings away from the mower. Further, FIG. 2 shows the chute 16 in its downward and operative position extending laterally from the mower in the manner just mentioned, and this downward position of the chute 16 prevents the operator from placing his foot in the path of the grass cutter blade 28 which is commonly rotating just within the vertical plane of mower housing outlet edge 27. That is, the chute 16 guides the grass and any debris laterally of the mower and away from the operator and it also protects against the operator placing his foot into the opening 14 and into the path of the rotating cutter 28.

Figure 1:
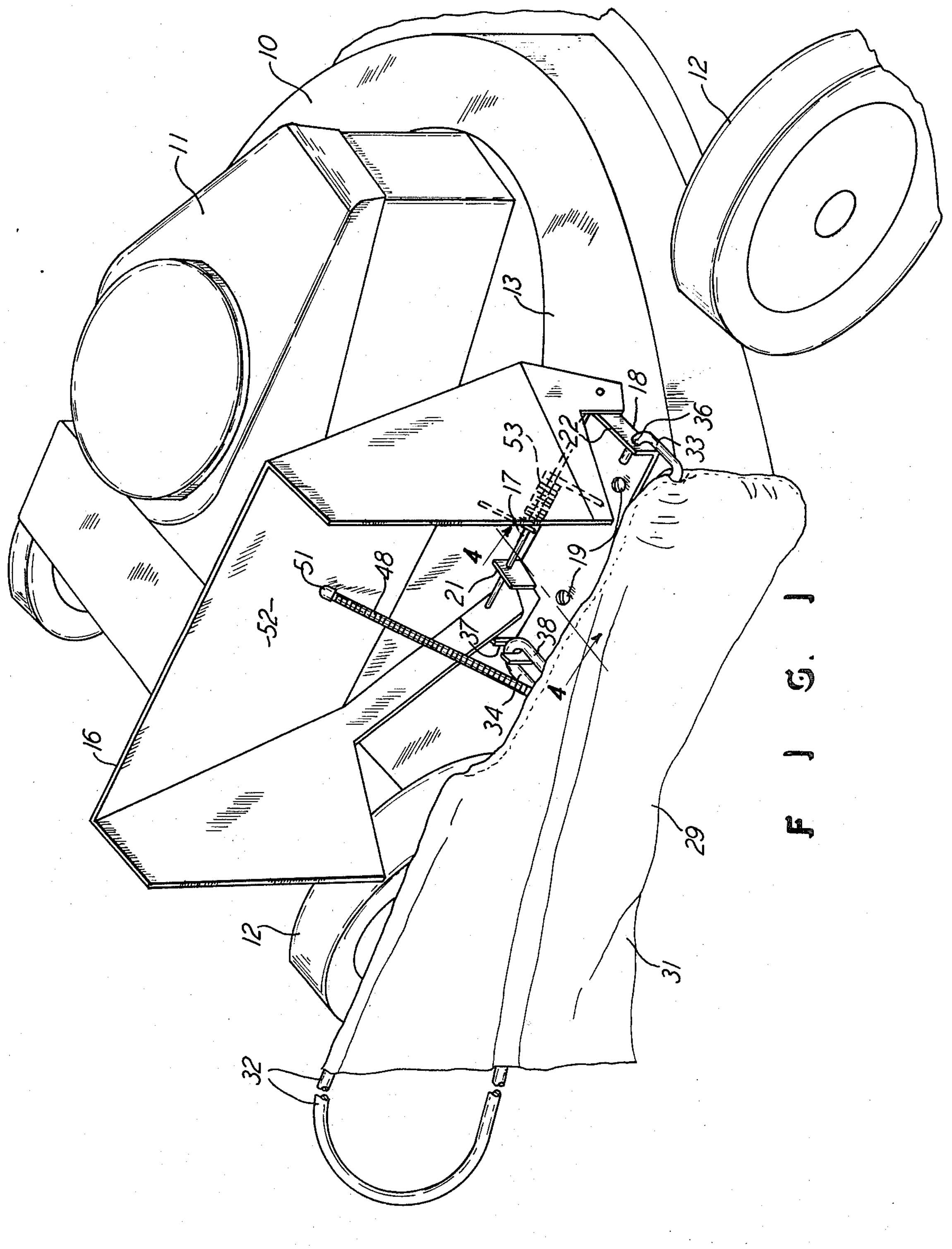
FIG. 1 is a side perspective view of a preferred embodiment of this invention and showing the bag catcher fragmentarily.

However, when it is desired to place a grass catcher bag onto the mower 10, then the chute 16 is no longer useful in deflecting the clippings away from the mower, and, in fact, the chute 16 is an obstacle in mounting and removing the grass catcher bag. FIG. 1 shows the grass catcher 29 which is only fragmentarily shown but which is similar to the bag such as that shown in U.S. Pat. No. 3,112,597 in that the grass catcher extends laterally and rearwardly from the mower 10. The catcher 29 includes the fabric type bag 31 and the hardware or rod 32 which extends in a loop as shown in FIG. 1 and which supports the bag 31. The entire bag assembly mounts on the mower to be in flow communication with the mower outlet 14 and thus receive the grass being blown and thrown from the mower.

The mounting bracket 18 provides the connector between the bag catcher 29 and the mower, and it will be seen that the bag hardware has hooks 33 and 34 which extend from the bag 31 and which releasably connect to the bracket 18. Thus the hook 33 extends through an opening 36 in the bracket upright portion 22, and the hook 34 rests down in a slot 37 in an upright portion 38 on the bracket 18. FIG. 3 further shows the relationship of the hooks 33 and 34 in the bag hardware, and here it will be seen that the bag hardware includes a front rectilinear portion generally designated 39 and which consists of the down-turned legs 41 and 42 and the upper cross bar 43 and the lower cross bars 44 connected between the legs 41 and 42. The hooks 33 and 34 are affixed to the upper cross bar 43, so the entire assembly is rigid with the rectilinear frame portion 39 and the rearward loop portion 32. With this arrangement, the operator can hold the loop end 32, while he is standing clear of the mower housing 10, and he can manipulate the entire catcher 29 to hook it onto the mounting bracket 18 in the position shown in FIG. 1.

It will of course be understood that FIG. 3 shows the forward end of the catcher 29, and only a fragment thereof is shown, and the bag 31 is positioned away from the cross bars 43 and 44, from its normal position shown in FIG. 1. Such showing in FIG. 3 for display of the cross bars 43 and 44, but it will be understood that the bag has an open mouth 46 defined by the sewn edge 47 which extends around the rectilinear hardware portion 39 for surrounding the mower opening 14 to be in flow communication therewith.

The catcher 29 is provided with a probe member 48 which is mounted in a socket 49 affixed to the cross bar 43 and which is elongated and extends upwardly from the rectilinear frame portion 39, as shown in FIGS. 1 and 3. The probe 48 is shown to have a protective upper end or tip 51 which is preferably a soft rubber-like or plastic material. Thus, in the mounting of the catcher 29 when the chute 16 is in the position shown in FIG. 2, the operator can manipulate the catcher 29 by holding adjacent the rearward end of the hardware 32 or adjacent the loop shown in FIG. 1, and the operator thus stands clear of the mover and in a safe position, and he can position the probe tip 51 to the undersurface 52 of the chute top wall 23. In doing so, he can hingedly move the chute 16 from its FIG. 2 position to its FIG. 1 position, and he can then clearly see the mounting means 36 and 37 on the bracket 18 for hooking the catcher 29 onto the mower 10. Throughout this operation, the operator stands in a safe position clear of the mower 10, and he need not contort his body position or make special maneuvers of any complicated or tiresome manner in order to mount the catcher 29, and the catcher is therefore mounted in an easy and ready manner.

An additional feature of the provision of the probe 48 on the catcher and of the particular mounting of the catcher on the mower is that the catcher 29 is pivotally mounted on the mower and the hooks 33 and 34 and their respective mounting means 36 and 37 are aligned with each other so that they present a pivot axis and thus the catcher 29 can pivot upwardly from the position shown in FIG. 1 which is the lowered or normal downward position of usefulness of the catcher 29. That is, when the mower is being moved adjacent a tree, bushes, building, or any obstacle, the catcher 29 can be pivoted upwardly about the common axis defined by the catcher hooks 33 and 34, and thus the mower 10 can be moved adjacent the obstacle, and the catcher will not be in the way since it will have been moved up from its normal operating position. The probe 48 is resilient and it therefore does flex to permit the pivoting described. FIG. 3 thus shows the probe 48 in a flexed position as seen in the dot-dash lines designated 48. It will therefore be understood that the probe 48 is an elongated finger-like member which is shown to be a spring resilient along its length but which is sufficiently stiff to move the chute 16 from the FIG. 2 position to the FIG. 1 position. However, the operator can pivot the catcher 29 when the mower and catcher assembly is moving past an obstacle, as mentioned, and in thus pivoting the catcher 29, the probe 48 can and will flex as the tip 51 remains in contact with the chute undersurface 52.

The chute 16 may be spring-urged downwardly to its FIG. 2 position to assure that the chute will always be in its operating position of deflecting the clippings and protecting the operator when the catcher 29 is not mounted. A torsion spring 53 is shown mounted on the hinge rod 17 and it has one end 54 extending to hook into a connector 56 on the undersurface 52. The other end 57 of the spring 53 is shown to be hooked into a raised portion 58 on the bracket 18 and at a point offset from the hinge pin 17. The entire arrangement with the spring 53 is such that the chute 16 is yieldingly urged downwardly and to the limit position shown in FIG. 2 where any portion of the chute 16 can be abutting the mower housing to establish that operative and downward limit position mentioned. The spring 53 is weaker than the stiffness of the probe 48, so the probe 48 can lift the chute 16 in the manner shown in FIG. 1 as the probe 48 overcomes the spring 53 without undue flexing of the probe 48.

What is claimed is:

1. A lawn mower and bag catcher assembly, comprising a mower housing having a grass discharge outlet, a chute hingedly mounted on said housing for positioning between a lowered position and a raised position and including a top wall and two uprightly disposed side walls depending from the opposite edges of said top wall and with each of the said three walls extendingly laterally of said housing in the direction of the axis of said grass discharge outlet and forming and extension to said grass discharge outlet in the lowered position, and with each said side wall terminating in an edge disposed upright at the laterally outer edge of said top wall and with the three said edges defining an opening directed laterally of said housing in the lowered position of said chute for continuance of flow of grass through said grass discharge outlet, a grass catcher including a rigid framework and a bag supported on said framework, a mounting member on said mower housing, suspension means on said framework for mounting said grass catcher onto said mounting member and positioning said bag in grass flow communication with said grass discharge outlet, a probe member on said framework and being horizontally insertable through the laterally directed said opening and extending upwardly from said framework and into abutment with said chute for hingedly moving and holding said chute in the raised position which is away from said grass discharge outlet and when said grass catcher is mounted on said mower housing.

2. The lower mower and bag catcher assembly as claimed in claim 1, including a spring supported on said mower housing and operatively engaged with said chute for yieldingly hingedly urging said chute toward the lowered position of extending in the direction of said axis of said grass discharge outlet.

3. The lawn mower and bag catcher assembly as claimed in claim 1, wherein said probe member is elongated and with the upwardly extending end of said probe member being in abutment with the undersurface of said top wall of said chute.

4. The lawn mower and bag catcher assembly as claimed in claim 3, wherein said probe member is a spring being resilient for bending off its elongation axis to adjust to the position of said chute when in abutment with said chute while said chute is in its raised position.

5. The lawn mower and bag catcher assembly as claimed in claim 3, wherein said bag framework extends away from said mower housing and to the end limits of said grass catcher and being available for manipulation of said grass catcher through the operator's grasping of the extending end of said grass catcher, and said probe member being attached to said framework at the end of said grass catcher adjacent said mower.

6. The lower mower and bag catcher assembly as claimed in claim 1, wherein said framework includes a portion extending adjacent said grass discharge outlet and includes an integral portion extending away from the first said portion and being available for manipulation of said grass catcher by the operator grasping said grass catcher during the mounting of said grass catcher onto said mower, and said probe member being attached to the first said portion and extending upwardly therefrom for abutting said chute and hingedly moving the same upwardly and clear of said grass discharge outlet.

7. The lawn mower and bag assembly as claimed in claim 6, wherein said probe member is a spring member being resilient, and wherein said mounting member is a pivot mounting for up and down pivotal movement of said grass catcher on said mower.

8. The lawn mower and bag assembly as claimed in claim 2, and wherein said probe member is an elongated spring for bending off its elongation axis and being of a stiffness greater than the spring strength of said spring on said mower for overcoming the latter said spring to thereby hingedly move said chute against the spring-urgings of said spring on said housing.

* * * * *